April 30, 1935.  L. G. BATES  1,999,749
APPARATUS FOR AND METHOD OF FEEDING MOLTEN GLASS
Filed March 19, 1934
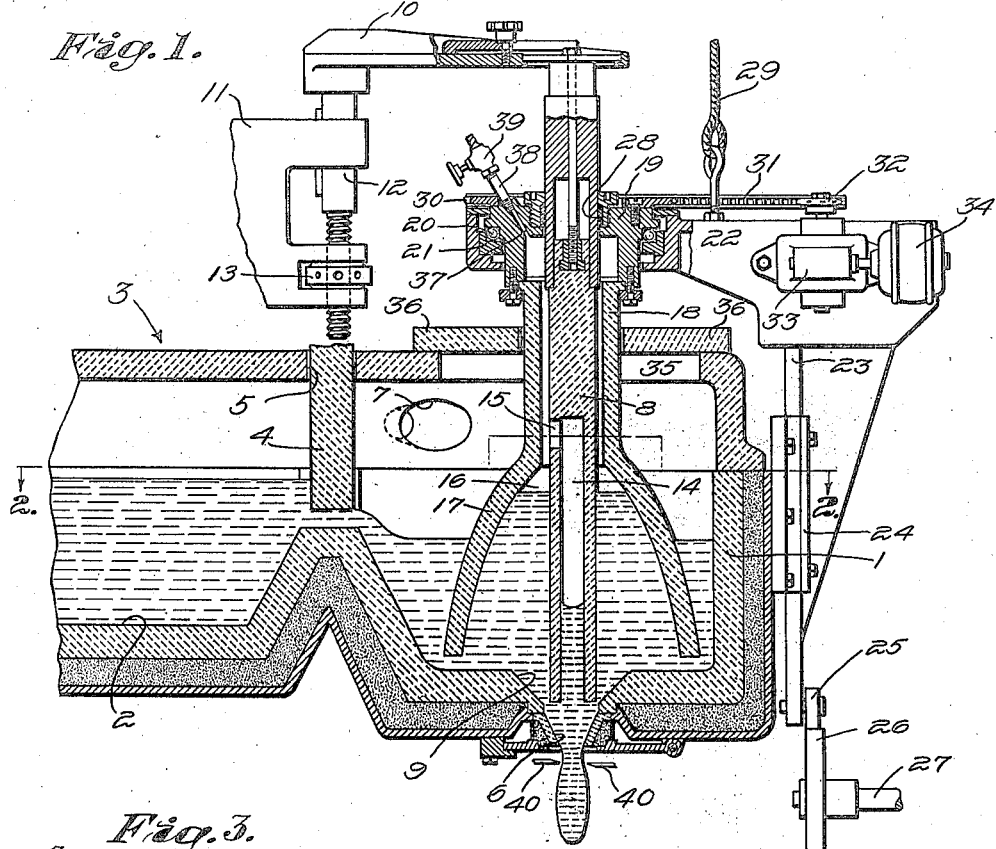
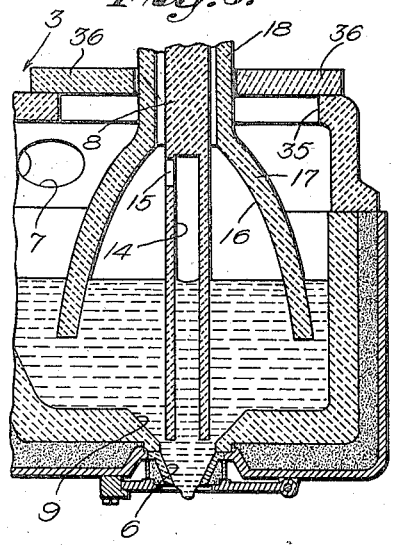
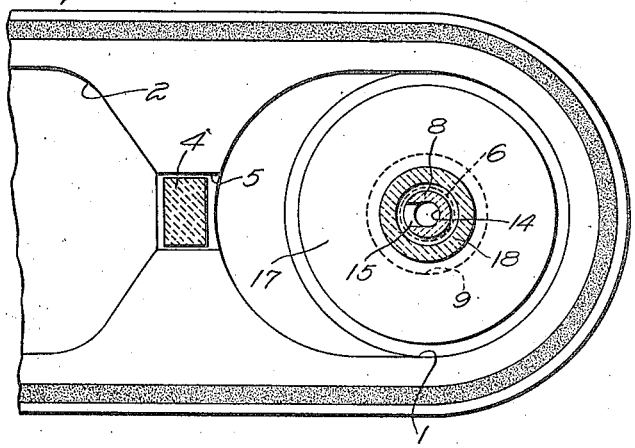

Patented Apr. 30, 1935

1,999,749

UNITED STATES PATENT OFFICE 1,999,749

APPARATUS FOR AND METHOD OF FEEDING MOLTEN GLASS

Lloyd G. Bates, West Hartford, Conn., assignor to Hartford-Empire Company, Hartford, Conn., a corporation of Delaware Application March 19, 1934, Serial No. 716,323

13 Claims. (Cl. 49—55)

This invention relates to improvements in the art of feeding molten glass through a submerged outlet in mold charges, and more particularly to improvements in glass feeding apparatus and methods which make use of a pressure space above the glass at the feed outlet and provide for periodic variations of pressure within that space to aid in controlling discharge of glass through the outlet and the formation below the outlet of successive suspended mold charge masses from which preshaped mold charges are periodically severed.

A glass feeder having a pressure space above the glass at the outlet and having provision for varying the effective pressure therein in each of successive cycles is ordinarily termed a "pneumatic feeder".

The pressure space referred to may be provided in a refractory tube or bell which is supported so that its open lower end is submerged in the glass of the feed chamber adjacent to and substantially in line with the discharge outlet. Different pressures in the pressure space of the pressure tube or bell ordinarily are provided and variations between such pressures are produced by operative connections between the pressure space and an air pump or air compressing and rarefying device that is located outside of the glass feeding chamber and is operated periodically to supply air to or compress the air in the pressure space and to withdraw air from or rarefy the air in such space. In addition to the operation of a pump or like device to produce superatmospheric and sub-atmospheric pressures in the pressure space, such pressure space may be connected temporarily with the atmosphere at the end of each period of superatmospheric pressure stroke and also at the end of each period of sub-atmospheric pressure. In some instances, the pressure space within the pressure tube or bell has been connected by suitable conduits with sources of superatmospheric and sub-atmospheric pressures even more remote than the pumps or like devices above referred to. Such conduits ordinarily are provided with valves which are operated by suitable timing devices to control the times of the applications of superatmospheric and sub-atmospheric pressures to the pressure space of the associate tube or bell.

An object of the present invention is to improve a so-called pneumatic feeder of the general type above referred to by providing for more flexible and extensive control of discharge of glass from the outlet and of cyclic variations of such discharge than have heretofore been possible.

A further object of the invention is the provision in a pneumatic feeder of the general type above referred to of improved means for and a novel method of causing periodic glass discharge accelerating and periodic glass flow retarding pressure impulses in the glass at the outlet.

A more specific object of the invention is the provision of a pneumatic feeder of the general type above referred to which will be self-contained in that different pressures and variations thereof may be produced in a confined pressure space above the glass at the outlet without the necessity of connecting this pressure space with any external source of supply of gaseous pressure, such as a pump, air compressing and rarefying device, or the like.

A further relatively specific object of the invention is to provide a pneumatic feeder of such character as to utilize a portion of the glass passing to the outlet as a component operating element of novel and efficient means for producing predetermined periodically varied different pressures in a pressure space above the glass at the outlet.

A further object of the invention is to provide a pneumatic feeder in which the means for causing desirable different pressures and variations of pressure in a confined pressure space above the glass at the outlet also may be employed to otherwise aid in controlling flow of glass to and through the outlet and in producing desirable homogeneity of and a uniform thermal condition in the glass passing to the outlet.

Other objects and advantages of the invention will become apparent from the following description of a practical embodiment thereof or will hereinafter be pointed out.

Reference now may be made to the accompanying drawing, in which:

Figure 1 is a fragmentary longitudinal vertical section through glass feeding apparatus embodying structural features of the present invention, certain parts of such apparatus being shown in elevation, the view showing the positions of operating parts of the apparatus at one time in a cycle of operations for the production of a mold charge.

Fig. 2 is a horizontal section substantially along the line indicated at 2—2 in Fig. 1; and Fig. 3 is a view similar to Fig. 1 but showing only the feed chamber and the parts therein, the view showing the operating parts of Fig. 1 in positions which they may occupy at another time in a cycle of operations as aforesaid.

In the drawing, the numeral 1 designates a feed chamber at the outer end of a glass flow channel 2 of a forehearth which is generally designated 3. The forehearth 3 may be connected with any suitable source of supply of molten glass, such as a glass melting tank (not shown) so that molten glass will tend to flow continuously along the flow channel 2 to the feed chamber 1.

The flow of glass from the channel 2 into the feed chamber 1 may be regulated by a refractory gate 4. The arrangement preferably is such as to provide and continuously maintain a predetermined quantity of glass in the feed chamber and to prevent any appreciable back flow of glass from the feed chamber to the flow channel when pressure has been applied to glass in the feed chamber or a portion of such glass has been displaced vertically as by the operation of mechanism which will be presently described.

The gate 4 is shown simply as a refractory member which depends through an opening 5 in the top of the cover structure of the forehearth between the side walls of the forehearth at the juncture of the flow channel 2 and feed chamber 1. As shown in Fig. 2, the portion of the gate above the glass is spaced sufficiently from the forehearth side walls to permit heated gases to pass from the space above the glass in the feeding chamber rearwardly into the space above the glass in the flow channel or vice versa. Any suitable adjusting means may be employed for supporting the refractory gate 4 so that the depth of its projection into the glass may be varied to regulate as required the normal level of glass in the feed chamber. Since adjustable gates as parts of forehearth structures are well known in the art, no illustration of a specific means for adjustably supporting the gate is required.

The feed chamber 1 has an outlet 6 in its bottom from which molten glass tends to issue under gravity and head pressure.

Any suitable known means for controlling the temperature and condition of the glass in the flow channel and in the feed chamber may be employed. Such temperature regulation may involve the introduction of heat into the feed chamber, as by a suitable burner or burners (not shown), each of which may be arranged to discharge a combustible fuel through a suitable opening in a wall of the forehearth, as for example, through an opening such as that indicated at 7 in Fig. 1.

A refractory pressure tube 8 depends through an opening in the top of the forehearth structure into the glass in the feed chamber and in substantial alignment with the outlet 6. This pressure tube 8 is shown as having its lower end located in a well 9 that is formed above the outlet 6, the upper end of the pressure tube being supported by an arm 10 which is adjustably supported on a bracket 11 or like supporting structure. As a simple means for adjustably supporting the tube 8, the arm 10 may be mounted on a vertical shaft 12 which has a screw-threaded portion engaged by an adjusting nut or wheel 13, whereby the shaft 12, the arm 10 and the tube 8 may be adjusted vertically as a unit independently of the bracket 11. The shaft 12 is of course retained against turning about its own axis, as by being feathered to the bracket.

The pressure space in the pressure tube 8 is indicated at 14 and extends from the lower end of the tube for only part of the length thereof. This pressure space is closed at its upper end but is in communication adjacent to its upper end through a lateral port 15 with the interior 16 of a hollow refractory pump member or bell 17. The port 15 is located above the highest level of glass in the feed chamber during normal glass feeding operations.

The bell 17 has a reduced portion or stem 18 which extends through an opening in the top of the forehearth structure in concentric relation with the pressure tube 8. A head 19 is connected with or integral with the stem 18 of the bell 17 and supports the latter anti-frictionally, as at 20, in a suitable bearing structure 21 at the outer end of a carrier 22. The carrier 22 is carried by a vertically reciprocable rod 23 which is guided in its vertical movements by a suitable guiding structure 24. The member 23 is provided at its lower end with a roller 25 resting upon a cam 26. The guiding structure 24 may be secured to the outer shell or casing of the feed chamber or to any suitable support, the arrangement being such that the carrier 22, the head 19 and the bell 17 will be reciprocated vertically as the cam 26 rotates about the axis of its supporting and driving shaft 27.

Instead of the simple structure shown in Fig. 1 for reciprocating the bell 17 vertically, an operating mechanism that is adjustable to adjust vertically the path of reciprocation of the bell and/or independently to adjust the upper and lower limits of the path of movement of the lower end of the bell may be employed. Adjustable operating mechanisms of this character are now well known in the art and therefore an example thereof need not be more particularly described herein or illustrated in the accompanying drawing.

The head 19 by which the bell is supported has an axial bore or opening through which the upper portion of the pressure tube 8 extends. A suitable packing gland or device, such as indicated at 28, is provided to assure an air-tight joint between the tube 8 and the head 19 while permitting a relative sliding movement between these two parts.

The carrier 22 and the parts carried thereby may be partially counterbalanced, as by means of a suitable counterweight (not shown) connected therewith by the cable 29 so as to reduce or minimize the weight to be carried by the roller 25 and the cam 26.

With the arrangement just described, the bell and its supporting head 19 are freely rotatable as a unit. In order to impart rotary motion thereto, a sprocket 30 on the head 19 may be connected by a chain 31 with a sprocket 32 on the driven shaft of a speed reduction unit 33. The speed reduction unit 33 and a motor 34 for driving it are shown as being attached to and supported by the carrier 22.

In order to permit convenient removal of the bell 17 from the forehearth, if desired for any purpose, the top of the forehearth structure is shown as being provided with a relatively large opening 35 through which the bell may be removed. This opening 35 is in turn covered by a removable cover block 36 which has an opening in which the stem of the bell may slide freely without leaving undue space between such stem and the wall of the opening in the block 36.

The chamber within the bell may be provided with an inlet in the form of an opening 37 through the wall of the head 19. A nipple 38 is secured in this inlet and is provided with a valve 39. The valve 39 is normally closed during glass feeding operations but may be opened at the beginning of operations for a purpose to be presently explained.

Shear blades 40 for severing mold charges from successive suspended mold charge masses of molten glass at a plane spaced below the lower end of the outlet are shown diagrammatically in Fig. 1. These blades may be operated by any suitable known means so as to sever the glass charges at the proper times. Suitable timing mechanism (not shown) may be employed to coordinate the operations of the severing means and of the vertically reciprocating bell 17.

From the foregoing description of various parts of a practical embodiment of the invention, the operation thereof will be readily understood.

At the beginning of glass feeding operations, the valve 39 may be opened and connected with the atmosphere or with a source of superatmospheric pressure or a source of sub-atmospheric pressure so as to produce a predetermined given pressure in the communicating chambers of the bell 17 and the pressure tube 8 when the bell is at a predetermined given position. The valve 39 then may be closed and any attachments that temporarily have been secured thereto may be removed so as not to interfere with rotary movements of the bell.

After the establishment of a given pressure within the space 14 of the pressure tube 8 when the bell is at a given place in its path of vertical movements, upward displacement of glass in the bell as the bell moves downward, as to the position shown in Fig. 1, and lowering of the glass level within the bell as the bell moves upward, as to or past the position shown in Fig. 3, may be relied on to produce periodically the desired different pressures on the glass at the lower end of the pressure space 14 of the tube 8 and the desired variations of pressure on such glass. Thus, as the bell moves downward to the position shown in Fig. 1, air or gaseous matter within the communicating confined spaces of the bell and the pressure tube 14 will be compressed to the extent required to accelerate discharge of glass from the outlet.

The compressed air or gaseous matter within these communicating spaces will of course tend to impart a downward impulse to the glass within the bell as well as to the glass within the lower end portion of the tube 8, but the rate of downward movement of the bell into the glass may be sufficiently rapid to effect the desired raising of the level of the glass in the bell despite this air pressure on such glass. The rate of downward movement of the bell into the glass may be predetermined, as by selection of a cam 26 of proper configuration.

The acceleration of discharge of glass from the outlet may result in part from the action of the pressure fluid on the glass both in the bell and in the lower portion of the tube 8, in part from the raising of the head of glass within the bell, and in part by a dynamic impulse produced by the movement of the bell downwardly in the glass in the feed chamber, the contact of the walls of the bell with the glass tending to force glass downwardly toward the outlet as well as causing a raising of the head of glass within the bell.

Raising of the bell, as to or through the position shown in Fig. 3, may be employed to enlarge the effective space for air or gaseous matter in the communicating chambers of the bell and pressure tube. The confined body of gaseous fluid or air therewithin thus may expand or be rarefied, with a consequent change of pressure on the glass in the lower end portion of the pressure tube and in the bell. The speed of upward movement of the bell and the consequent change of pressure on the glass at the lower end of the pressure space of the tube 8 may be predetermined by selection of a cam 26 of appropriate configuration.

The fluid pressure applied through the tube 8 to the glass directly above the outlet may be varied from a pressure above atmospheric pressure to a pressure below atmospheric pressure, or between any other predetermined desirable limits as the bell 17 goes through its cycle of reciprocatory movements.

The rotary movement of the bell 17 may be employed primarily to make the glass in the feed chamber more nearly homogeneous and thermally uniform as such glass passes to the outlet. However, if desired, the rotary movement of the bell may be employed to aid in controlling discharge of glass from the outlet. Thus, the rotary movement of the bell might be temporarily accelerated after the severance of a mold charge from a mold charge mass of glass in suspension below the outlet so as to aid in producing a retractive impulse on the stub of glass that has been left after the severing operation. No particular mechanism for causing a variation in the rate of rotary movement of the bell has been illustrated in the accompanying drawing, or particularly described herein, as means for effecting such variations are well known in the art.

The downward movement of the bell may be commenced at a predetermined time in the cycle of operations for the formation of a suspended mold charge mass and this downward movement may be of such character as to accelerate discharge of glass from the outlet to shape the accumulating suspended mold charge mass of glass or a predetermined portion thereof as desired. The initial part of the upward movement of the bell may be relatively rapid so as to produce a sudden reversal of fluid pressure on the glass at or adjacent to the outlet. The upward movement of the bell may be commenced before the shears 40 start to close, simultaneously with the closing of the shears, or immediately after the shears start to close.

As hereinbefore has been stated, the initial part of the upward movement of the bell may be of such character as not only to reduce the fluid pressure on the glass at the outlet but also to cause a retractive impulse on such glass by reason of the tendency of the atmospheric pressure on the glass at the outlet to force such glass upwardly toward the space vacated by the lower end of the bell. In addition, as also has been hereinbefore pointed out, the rotary movement of the bell may be temporarily accelerated to aid in retracting the glass stub after the severance of a charge or in temporarily preventing or retarding issuance of glass from the outlet at or about the time of a charge severing operation.

The remainder of the upstroke of the bell may be at a slower speed and discharge of glass by gravity may commence before the bell reaches the upper limit of its stroke or after it has reached such limit.

The bell may dwell temporarily at one or more points in its path of movements, as at the upper or lower limit thereof or at both of these places, or elsewhere.

It of course will be understood that the gate 5 is set at a desirable position or adjusted to assure appropriate inflow of glass to the feed chamber and the maintenance of a suitable supply body of molten glass in the feed chamber.

Instead of maintaining the pressure tube 8 stationary during feeding operations with its lower end at an adjusted distance from the outlet, the bracket 11 may be reciprocated vertically by any suitable mechanism, as for example by mechanism similar to that shown for reciprocating the carrier 22, so as to produce a still further range of control of glass discharge regulating impulses and glass charge shaping effects. Such vertical reciprocations of the tube 8 may be effected in synchronism with the reciprocations of the bell 17 or in any predetermined desirable coordinated relationship therewith.

According to the present invention, a relatively great number of discharge controlling agencies are available for use in various combinations which may be predetermined and selected to meet particular service conditions and requirements at any given time. The charge shaping effects produced by the reciprocation of the bell 17 may be varied by adjustment of the entire path of its vertical reciprocation, or by independent adjustment of one or both of the limits of such path. These charge shaping effects likewise may be varied by the use at different times of cams 26 of different contours. Also, the charge shaping effects of the reciprocatory movement of the bell may be varied by varying the initial fluid pressure within the communicating spaces of the bell and the pressure tube 8 at the beginning of feeding operations when the bell is at a predetermined given position. Still further, the charge shaping effects produced by the reciprocation of the bell may be varied by adjusting vertically the position of the lower end of the pressure tube with respect to the outlet and/or by reciprocating the pressure tube 8 either in unison with the bell or independently of the bell but in timed relationship therewith.

Instead of placing the bell concentric with the pressure tube 8, as in the preferred embodiment of the invention shown in the drawing, the bell may be located elsewhere in the feed chamber or in the glass flow channel. In either case, the bell should have its internal chamber suitably connected with the interior of the pressure tube so that the reciprocations of the bell in the glass and the resultant periodic reciprocatory movements of the piston of molten glass in the bell will be employed to produce periodically different fluid pressures and variations of pressure on the glass at the lower end of the pressure tube, substantially as hereinbefore described and for the purpose set forth.

Apparatus and methods coming within the purview of the invention as defined in the appended claims may vary considerably in their structural details and component steps from those hereinbefore particularly described. Such claims therefore are not to be limited except by their terms and by the available prior art.

I claim:

1. Glass feeding apparatus comprising a container for a supply body of molten glass, said container having a discharge outlet submerged by glass of the supply body, means for confining a body of gaseous material between glass of the portion of the supply body adjacent to said outlet and glass of another portion of the supply body, and means for causing relative movements between the glass of said last named portion of the supply body and said confining means periodically to compress and periodically to rarefy said confined body of gaseous material.

2. Glass feeding apparatus comprising a container for molten glass, said container having a discharge outlet submerged by the molten glass therewithin, a pressure tube extending into the glass in the container in substantial alignment with the outlet, said pressure tube having an internal cavity open at the end thereof nearest the outlet, a pump chamber having an open end submerged in the molten glass in the container, means connecting the pump chamber and the pressure tube for confining gaseous material between the glass in the submerged portion of said pump chamber and the glass in the submerged end of the pressure tube, and means for causing the glass in the submerged portion of the pump chamber to move as a piston therein periodically to compress and periodically to rarefy said confined gaseous material.

3. Glass feeding apparatus comprising a container for molten glass, said container having a discharge outlet in its base, means for maintaining a substantial body of molten glass in the container in position to submerge said outlet, a pressure tube having an open lower end portion depending into the glass in said container in substantial alignment with said outlet, a pump chamber surrounding said pressure tube and having its lower end closed to the atmosphere by the glass in said container, said pump chamber and the interior of said pressure tube being in communication with each other at a place above the highest level of glass in either of these members, said pressure tube being closed above said place of communication, means for producing an air-tight joint between said pressure tube and said pump chamber at a place above said place of communication whereby to confine a body of gaseous material between the glass in the submerged portion of the pressure tube and the glass in the submerged portion of the pump chamber, and means for causing periodic relative movements between the glass in the pump chamber and the walls of said pump chamber, periodically to compress and periodically to rarefy said confined body of gaseous material.

4. Glass feeding apparatus comprising a container for a supply body of molten glass, said container having a discharge outlet in its base submerged by glass of the supply body, a pressure tube extending into the glass in the container in line with said outlet, a vertically reciprocable bell surrounding said pressure tube and having its lower end submerged in the glass in the container, the lower end of the cavity of said pressure tube being closed to the atmosphere by glass of the supply body, said pressure tube having a lateral port above the glass in the bell to establish communication between said pressure tube cavity and the interior of the bell, said pressure tube cavity being closed above said port, means providing an air-tight joint between said bell and said pressure tube at a place above the level of said port while permitting reciprocation of said bell, and means for reciprocating said bell vertically while maintaining the lower end thereof continuously in the glass in said container so as periodically to compress and periodically to rarefy gaseous matter within the space above the glass in said pressure tube.

5. Glass feeding apparatus comprising a container for a supply body of molten glass, said container having a discharge outlet in its base submerged by glass of the supply body, a pressure tube extending into the glass in the container in line with said outlet, a vertically reciprocable bell surrounding said pressure tube and having its lower end submerged in the glass in the container, the lower end of the cavity of said pressure tube being closed to the atmosphere by glass between said pressure tube and said outlet, said pressure tube having a lateral port at a level above that of the glass in the bell to establish communication between said pressure tube cavity and the interior of the bell, said pressure tube cavity being closed above said port, means providing an air-tight joint between said bell and said pressure tube at a place above the level of said port while permitting reciprocation of said bell, means for reciprocating said bell while maintaining the lower end thereof continuously in the glass in said container so as periodically to compress and periodically to rarefy gaseous matter in the space above the glass in said pressure tube, and means for imparting a rotary movement to said bell.

6. Glass feeding apparatus comprising a container for a supply body of molten glass, said container having a discharge outlet in its base submerged by glass of the supply body, a refractory pressure tube depending into the glass in the container in substantially axial alignment with said outlet, a vertically reciprocable refractory bell surrounding said pressure tube and depending into the glass in the container in spaced relation with the walls of said container, a head for said bell cooperating with the pressure tube to provide an air-tight joint between the bell and the pressure tube while permitting reciprocatory movement of the bell independently of the pressure tube, means for supporting said head for reciprocatory vertical movements and for rotation about the axis of the bell, said head being connected with said bell so as to rotate the bell when said head is rotated, said pressure tube being closed at a level above the highest level of glass therein and having a lateral port to establish communication between the interior of the bell and the interior of the pressure tube, means for reciprocating the bell to cause the glass therein to act as a piston for compressing and rarefying gaseous matter in the communicating internal portions of the bell and pressure tube, and means for rotating said bell.

7. The method of feeding molten glass through an outlet of a container, comprising the steps of maintaining a supply body of molten glass in the container in position to submerge said outlet, confining a body of gaseous material between the glass adjacent to the outlet and glass of another portion of the supply body, and causing cyclic movements of glass of said last named portion of the supply body with relation to the confined body of gaseous material periodically to change the pressure of said confined body of gaseous material on the glass adjacent to said outlet.

8. The method of feeding molten glass in mold charges which comprises flowing glass from a source of supply to a feed chamber having an outlet in its bottom so as to submerge the outlet with a substantial body of molten glass, confining a body of air between a portion of glass directly over the outlet and another portion of the glass in the feed chamber, and periodically compressing and periodically rarefying said confined body of air by causing periodic relative movements between said portions of molten glass, whereby periodically to accelerate and periodically to retard discharge of glass from said outlet.

9. The feeding of molten glass which comprises maintaining a substantial body of molten glass in a feed chamber in position to submerge a discharge outlet in the base of said feed chamber, confining a body of gaseous fluid within the feed chamber so that an end portion of said body of gaseous fluid bears against glass directly in line with glass in said outlet, and periodically compressing and rarefying said confined body of gaseous fluid by moving a portion of the glass in the feed chamber as a piston in contact with another portion of the confined body of gaseous fluid, whereby periodically to accelerate and periodically to retard discharge of glass from the outlet.

10. The method of feeding molten glass which comprises maintaining a substantial body of molten glass in a feed chamber so as to submerge a discharge outlet in the base of the feed chamber, confining a body of gaseous material between a portion of the glass in the feed chamber directly in line with said outlet and an annular portion of the glass in the feed chamber concentric with the outlet, and causing raising and lowering of the surface of said annular portion of glass in the feed chamber periodically to compress and periodically to rarefy said confined body of gaseous material, whereby periodically to accelerate discharge and periodically to retard discharge of glass from said outlet.

11. In the art of feeding molten glass by the use of glass feeding apparatus including a container having a discharge outlet submerged by molten glass of a supply body, means providing a pressure fluid space closed at its lower end by glass of the supply body and located directly over the outlet and a pump operatively connected with said pressure fluid space for causing cyclic changes of pressure in said space periodically to vary the discharge of glass from the outlet, that improvement which comprises employing a portion of the molten glass of the supply body as the effective piston of a pump for causing cyclic changes of pressure in said pressure space.

12. In the art of feeding molten glass by the use of glass feeding apparatus including a container having a discharge outlet submerged by molten glass of a supply body, means providing a pressure fluid space closed at its lower end by glass of the supply body and located directly over the outlet, that improvement which comprises the steps of disposing a pump chamber having an open lower end in such a position that its open lower end will be submerged by molten glass of the supply body, operatively connecting said pump chamber with the pressure space over the glass at the outlet, and causing periodic relative movements between the glass in said pump chamber and the walls of said pump chamber periodically to change the pressure in said pressure space.

13. In the art of feeding molten glass by the use of glass feeding apparatus including a container having a discharge outlet submerged by molten glass of a supply body and means providing a pressure fluid space closed at its lower end by glass of the supply body directly in line with the outlet, that improvement which comprises the steps of disposing a pump chamber having an open lower end in position to cause said open lower end of the pump chamber to be submerged by molten glass of the supply body, operatively connecting the pump chamber with the pressure fluid space above the glass in line with the outlet, and reciprocating said pump chamber vertically while maintaining its lower end continuously immersed in the glass of the supply body so as periodically to increase and periodically to reduce the effective pressure on the glass at the lower end of said pressure fluid space.

LLOYD G. BATES.